United States Patent
Tsukagoshi et al.

(10) Patent No.: US 7,760,407 B2
(45) Date of Patent: Jul. 20, 2010

(54) MULTILAYER HOLOGRAPHIC RECORDING MEDIUM AND MANUFACTURING METHOD OF THE SAME, MULTILAYER HOLOGRAPHIC RECORDING AND REPRODUCING METHOD, MULTILAYER HOLOGRAPHIC MEMORY REPRODUCING APPARATUS, AND MULTILAYER HOLOGRAPHIC RECORDING AND REPRODUCING APPARATUS

(75) Inventors: Takuya Tsukagoshi, Sagamihara (JP); Jiro Yoshinari, Tokyo (JP); Hideaki Miura, Tokyo (JP); Tetsuro Mizushima, Moriguchi (JP)

(73) Assignee: TDK Corporation, Tokyo (JP)

( * ) Notice: Subject to any disclaimer, the term of this patent is extended or adjusted under 35 U.S.C. 154(b) by 397 days.

(21) Appl. No.: 10/577,245

(22) PCT Filed: Sep. 3, 2004

(86) PCT No.: PCT/JP2004/012850

§ 371 (c)(1),
(2), (4) Date: Apr. 26, 2006

(87) PCT Pub. No.: WO2005/043256

PCT Pub. Date: May 12, 2005

(65) Prior Publication Data

US 2007/0081439 A1 Apr. 12, 2007

(30) Foreign Application Priority Data

Oct. 31, 2003 (JP) .............................. 2003-372672

(51) Int. Cl.
*G03H 1/26* (2006.01)
*G03H 1/30* (2006.01)
*G03H 1/22* (2006.01)

(52) U.S. Cl. ................................ 359/22; 359/25; 359/32
(58) Field of Classification Search ..................... 359/3, 359/25, 22
See application file for complete search history.

(56) References Cited

U.S. PATENT DOCUMENTS

| 5,755,919 A | 5/1998 | Ueda et al. |
| 5,993,600 A | 11/1999 | Ueda et al. |
| 2003/0039001 A1* | 2/2003 | King et al. .................... 359/35 |
| 2004/0085599 A1* | 5/2004 | Kim ............................ 359/35 |

FOREIGN PATENT DOCUMENTS

| JP | A 6-195019 | 7/1994 |
| JP | A 8-220976 | 8/1996 |
| JP | A-62-265613 | 11/1997 |
| JP | A 11-224043 | 8/1999 |
| JP | A-2000-105529 | 4/2000 |
| JP | A 2000-149318 | 5/2000 |
| JP | A 2001-325729 | 11/2001 |

* cited by examiner

*Primary Examiner*—Stephone B Allen
*Assistant Examiner*—Jade R Callaway
(74) *Attorney, Agent, or Firm*—Oliff & Berridge, PLC

(57) ABSTRACT

A multilayer holographic recording medium that improves recording density and data transfer rates. The multilayer holographic recording medium, from which information is reproduced by a multilayer holographic memory reproducing apparatus, includes a plurality of deposited holographic recording layers. During recording, a reference beam is common to those holographic recording layers and an incident angle of an object beam is modulated for each holographic recording layer. During reproduction, a laser beam for reproduction having the same condition as that of the reference beam used for recording is projected thereto, so that diffraction beams are simultaneously generated in the respective holographic recording layers to directions that are the same as incident directions of the object beam used for recording.

13 Claims, 11 Drawing Sheets

(A)

(B)

US 7,760,407 B2

MULTILAYER HOLOGRAPHIC RECORDING MEDIUM AND MANUFACTURING METHOD OF THE SAME, MULTILAYER HOLOGRAPHIC RECORDING AND REPRODUCING METHOD, MULTILAYER HOLOGRAPHIC MEMORY REPRODUCING APPARATUS, AND MULTILAYER HOLOGRAPHIC RECORDING AND REPRODUCING APPARATUS

TECHNICAL FIELD

The present invention relates to a multilayer holographic recording medium including a number of deposited holographic recording layers in each of which interference fringes can be formed by projecting an object beam and a reference beam, a manufacturing method of the same, and a method and an apparatus for recording and reproducing information on/from that multilayer holographic recording medium.

BACKGROUND ART

Conventionally, an information reading apparatus for reading information recorded on the above-described type of multilayer holographic recording medium is known such as described in Japanese Patent Laid-Open Publication No. 2000-149318, for example. In this apparatus, a light source and an objective lens are moved so as to make light incident on a desired recording layer and a focusing optical system, an expanding optical system, and a two-dimensional photodetector are integrally moved up and down, thereby selectively performing reproduction for each recording layer of multilayer type hologram.

Japanese Patent Laid-Open Publication No. 2000-149318 also discloses an apparatus that can selectively perform reproduction for each recording layer only by moving a correction optical system up and down without moving the focusing optical system, the expanding optical system, and the two-dimensional photodetector up and down.

That is, the information reading apparatus described in Japanese Patent Laid-Open Publication No. 2000-149318 requires either integral upward and downward movement of the focusing optical system, the expanding optical system, and the two-dimensional photodetector or upward and downward movement of the correction optical system only without moving the focusing optical system, the expanding optical system, and the two-dimensional photodetector up and down. Therefore, that information reading apparatus has limits on improvement of recording density and a data transfer rate because of precision and a rate of the upward and downward movement of these elements.

DISCLOSURE OF THE INVENTION

This invention has been made in view of the abovementioned problems. Accordingly, it is an object of the invention to provide a multilayer holographic recording medium that can further improve recording density and a data transfer rate, and also provide a manufacturing method of the same, a multilayer holographic recording and reproducing method, a multilayer holographic memory reproducing apparatus, and a multilayer holographic recording and reproducing apparatus.

The present inventor has conducted intensive studies and has consequently found the followings: When information is recorded on a number of holographic recording layers, a projection condition of one of a reference beam and an object beam is fixed and the other is modulated for each holographic recording layer, thereby making a Bragg's condition different for each holographic recording layer. When the information is reproduced, one of the object beam and the reference beam is used to cause simultaneous generation of diffraction beams in the respective holographic recording layers, thereby simultaneously or individually reproducing information from those diffraction beams. In this manner, recording density and a data transfer rate of a multilayer holographic recording medium can be largely improved.

In Summary, the above-described objectives are achieved by the following embodiments of the present invention.

(1) A multilayer holographic recording and reproducing method for holographically recording information on a multilayer holographic recording medium including a number of deposited holographic recording layers in each of which interference fringes can be formed by projecting an object beam and a reference beam that are split from a laser beam and for reproducing the recorded information by projecting a laser beam for reproduction, the method comprising: a process of recording the information by fixing a projection condition of one of the object beam and the reference beam and modulating the other for each of the holographic recording layers so that the holographic recording layers each have a different Bragg's condition; and a process of projecting the laser beam for reproduction onto the deposited holographic recording layers with the same projection condition as the fixed projection condition of the one of the object beam and the reference beam to generate a diffraction beam in an upper holographic recording layer and to make a transmitted 0-th order diffraction beam be projected onto a lower holographic layer one by one, thereby simultaneously or individually reproducing pieces of information from diffraction beams generated in the respective holographic recording layers by the projected beams.

(2) The multilayer holographic recording and reproducing method according to (1), wherein; during the holographic recording, the information is recorded by fixing a projection condition of the reference beam and modulating the object beam for each of the holographic recording layers; and the laser beam for reproduction having the same projection condition as that of the reference beam is projected onto the deposited holographic recording layers, the diffraction beams generated in the respective holographic recording layers by the projected beams are detected by two-dimensional photodetectors a number of which is equal to that of the holographic recording layers, and the pieces of information are reproduced from light-detecting signals of the two-dimensional photodetectors.

(3) The multilayer holographic recording and reproducing method according to (1) or (2), wherein the information is recorded by shift-multiplex recording for each of the holographic recording layers over an entire surface thereof.

(4) The multilayer holographic recording and reproducing method according to (1), (2) or (3), wherein an angle of the other of the object beam and the reference beam is modulated for each of the holographic recording layers during the holographic recording.

(5) The multilayer holographic recording and reproducing method according to (4), wherein during the reproduction of information, a beam diameter of the laser beam for reproduction is enlarged, and the laser beam for reproduction is modulated by spatial light modulation to make a part of the laser beam for reproduction incident on the holographic recording layers from a different position within the enlarged beam diameter.

(6) The multilayer holographic recording and reproducing method according to (5), wherein during the reproduction of information, the laser beam for reproduction is reflected by a rotating mirror and a concave mirror to be incident on the holographic recording layers.

(7) The multilayer holographic recording and reproducing method according to (1), wherein during the holographic recording of information, the information is recorded by modulating an intensity of the object beam in accordance with the information to be recorded and modulating the reference beam by phase spatial light modulation for each of the holographic recording layers such that the interference fringes in each of the holographic recording layers have a phase code pattern different from those in the other holographic recording layers; and during the reproduction of information, the laser beam for reproduction is modulated by phase spatial light modulation for each of the holographic recording layers from which the information is to be reproduced, so as to have a corresponding phase code pattern, and is then projected onto the holographic recording layers.

(8) A multilayer holographic recording and reproducing method for holographically recording information on a multilayer holographic recording medium including a number of deposited holographic recording layers in each of which interference fringes can be formed by projecting an object beam and a reference beam that are split from a laser beam, and for reproducing the recorded information, the method comprising: recording the information by modulating an intensity of the object beam in accordance with the information to be recorded, modulating an incident angle of the object beam for each of the holographic recording layers, and modulating the reference beam by phase spatial light modulation in accordance with an address to be assigned such that each of the holographic recording layers has a phase code pattern that is different for each address; and during the reproduction of information, modulating the laser beam for reproduction by phase spatial light modulation with the same projection condition as that of the reference beam to have the phase code pattern, and projecting the modulated laser beam onto the holographic recording layers.

(9) A holographic recording and reproducing apparatus for recording information on a multilayer holographic recording medium including a number of deposited holographic recording layers in each of which interference fringes can be formed by projecting an object beam and a reference beam from a laser beam source and for reproducing the recorded information by projecting a laser beam for reproduction, the apparatus comprising: an object optical system and a reference optical system for directing the object beam and the reference beam to the multilayer holographic recording medium, respectively; a reproducing laser optical system for projecting the laser beam for reproduction onto the deposited holographic recording layers; and two-dimensional photodetectors for reproducing pieces of information from diffraction beams generated in the respective holographic recording layers by the laser beams for reproduction, a number of the two-dimensional photodetectors being equal to that of the diffraction beams, wherein a projection condition of a laser beam in one of the object optical system and the reference optical system is fixed and a projection condition of a laser beam in the other is modulated for each of the holographic recording layers to record information on each of the holographic recording layers with a different Bragg's condition, and the reproducing laser optical system has the same projection condition as the fixed projection condition.

(10) The multilayer holographic recording and reproducing apparatus according to (9), wherein the reference optical system is configured to fix a projection condition of the reference beam, the object optical system includes an object beam modulator for modulating the object beam for each of the holographic recording layers, the reproducing laser optical system is configured to make the laser beam for reproduction be projected onto the deposited holographic recording layers with the same projection condition as that of the reference beam, and the two-dimensional photodetectors are configured to separately detect diffraction beams generated in the respective holographic recording layers by the projected beams.

(11) The multilayer holographic recording and reproducing apparatus according to (9) or (10), wherein the object optical system and the reference optical system are configured to record the information by shift-multiplex recording for each of the holographic recording layers over an entire surface thereof.

(12) The multilayer holographic recording and reproducing apparatus according to (9) or (10), wherein the other of the object optical system and the reference optical system has an angle modulator for modulating an angle of the other of the object beam and the reference beam for each of the holographic recording layers during the holographic recording.

(13) The multilayer holographic recording and reproducing apparatus according to (12), comprising: a beam expander for enlarging a beam diameter of the laser beam for reproduction during the reproduction of information; and a spatial light modulator for modulating the laser beam for reproduction having the enlarged beam diameter by spatial light modulation to make a part of the laser beam for reproduction incident on the holographic recording layers from a different position within the enlarged beam diameter.

(14) The multilayer holographic recording and reproducing apparatus according to (12), comprising an angle modulator for a laser beam for reproduction that reflects the laser beam for reproduction by a rotating mirror and a concave mirror to make the laser beam for reproduction incident on the holographic recording layers during the reproduction of information.

(15) The multilayer holographic recording and reproducing apparatus according to (9), wherein the object optical system includes an amplitude spatial light modulator for modulating an intensity of the object beam in accordance with the information to be recorded during the holographic recording of information, and the reference optical system includes a phase spatial light modulator for modulating the reference beam for each of the holographic recording layers by phase spatial light modulation to make interference fringes in the respective holographic recording layers have a different phase code pattern from each other, and the reproducing laser optical system includes a phase spatial light modulator for a laser beam for reproduction that modulates the laser beam for reproduction by phase spatial light modulation for each of the holographic recording layers from which the information is to be reproduced during the reproduction of information such that the laser beam for reproduction has a corresponding phase code pattern.

(16) A multilayer holographic recording and reproducing apparatus for recording information on a multilayer holographic recording medium including a number of deposited holographic recording layers in each of which interference fringes can be formed by projecting an object beam and a reference beam from a laser beam source and for reproducing the recorded information by projecting a laser beam for reproduction, the apparatus comprising: an object optical system and a reference optical system for directing the object beam and the reference beam to the multilayer holographic recording medium, respectively; a reproducing laser optical system for projecting the laser beam for reproduction onto the deposited holographic recording layers; and two-dimensional photodetectors for reproducing pieces of information from diffraction beams generated in the respective holographic recording layers by the laser beams for reproduction, a number of the two-dimensional photodetectors being equal to that of the diffraction beams, wherein the object optical system includes an angle modulator for an object beam that modulates an intensity of the object beam in accordance with information to be recorded and modulates an incident angle of the object beam for each of the holographic recording layers, the reference optical system includes a phase spatial light modulator for modulating the reference beam by phase spatial light modulation in accordance with an address to be assigned to make each holographic recording layer have a phase code pattern that is different for each address, and the reproducing laser optical system includes a phase spatial light modulator for a laser beam for reproduction that modulates the laser beam for reproduction by phase spatial light modulation to make the laser beam for reproduction have the phase code pattern during the reproduction of information.

(17) A holographic memory reproducing apparatus for reproducing recorded information by projecting a laser beam for reproduction from a reproducing laser optical system onto a multilayer holographic recording medium, the multilayer holographic recording medium including a number of deposited holographic recording layers, the information being recorded by fixing a projection condition of one of an object beam and a reference beam from a laser beam source and modulating a projection condition of the other thereof for each of the holographic recording layers to make a Bragg's condition different for each of the holographic recording layers, the holographic memory reproducing apparatus comprising two-dimensional photodetectors for reproducing pieces of information from diffraction beams generated in the respective holographic recording layers by the laser beams for reproduction, a number of the two-dimensional photodetectors being equal to that of the diffraction beams, wherein the reproducing laser optical system has the same projection condition as the fixed projection condition.

(18) The multilayer holographic memory reproducing apparatus according to (17), wherein the reproducing laser optical system is configured to make the laser beam for reproduction be projected onto the deposited holographic recording layers under the same projection condition as that of the reference beam, and the two-dimensional photodetectors are configured to separately detect the diffraction beams generated in the respective holographic recording layers by the projected beams.

(19) The multilayer holographic memory reproducing apparatus according to (17) or (18), wherein the information is recorded by shift-multiplex recording for each of the holographic recording layers in the holographic recording medium over an entire surface thereof.

(20) The multilayer holographic memory reproducing apparatus according to (17) or (18), wherein the information on the multilayer holographic recording medium is recorded by angle multiplex recording in which an angle of the other of the object beam and the reference beam is modulated for each of the holographic recording layers, and the reproducing laser optical system includes: a beam expander for enlarging a beam diameter of the laser beam for reproduction; and a spatial light modulator for modulating the laser beam for reproduction having the enlarged beam diameter by spatial light modulation to make a part of the laser beam for reproduction incident on the holographic recording layers from a different position within the enlarged beam diameter.

(21) The multilayer holographic memory reproducing apparatus according to (17) or (18), comprising an angle modulator for a laser beam for reproduction that reflects the laser beam for reproduction by a rotating mirror and a concave mirror to make the laser beam for reproduction incident on the holographic recording layers.

(22) The multilayer holographic memory reproducing apparatus according to (17), wherein the information is recorded on the multilayer holographic recording medium by modulating the reference beam by phase spatial light modulation for each of the holographic recording layers to make the interference fringes have a different phase code pattern, and the reproducing laser optical system includes a phase spatial light modulator for a laser beam for reproduction that modulates the laser beam for reproduction by phase spatial light modulation for each of the holographic recording layers from which the information is to be reproduced during the reproduction of information such that the laser beam for reproduction has a corresponding phase code pattern.

(23) A multilayer holographic memory reproducing apparatus for reproducing recorded information by projecting a laser beam for reproduction onto a multilayer holographic recording medium, the multilayer holographic recording medium including a number of deposited holographic recording layers in each of which interference fringes can be formed by projecting an object beam and a reference beam from a laser beam source, the information being recorded on the multilayer holographic recording medium by modulating an intensity of the object beam in accordance with information to be recorded, modulating an incident angle of the object beam for each of the holographic recording layers, and modulating the reference beam by phase spatial light modulation in accordance with an address to be assigned to make the holographic recording layers have a phase code pattern that is different for each address, the apparatus comprising: a reproducing laser optical system for projecting the laser beam for reproduction onto the deposited holographic recording layers; and two-dimensional photodetectors for reproducing pieces of information from diffraction beams generated in the respective holographic recording layers by the laser beams for reproduction, a number of the two-dimensional photodetectors being equal to that of the diffraction beams, wherein the reproducing laser optical system includes a phase spatial light modulator for a laser beam for reproduction that modulates the laser beam for reproduction by phase spatial light modulation to make the laser beam for reproduction have the phase code pattern during the reproduction of information.

(24) A multilayer holographic recording medium comprising a number of deposited holographic recording layers in each of which interference fringes generated by projecting an object beam and a reference beam are formed, wherein information is recorded on the respective holographic recording layers by fixing a projection condition of one of the object beam and the reference beam and modulating a projection condition of the other for each of the holographic recording layers to make a Bragg's condition different for each of the holographic recording layers.

(25) The multilayer holographic recording medium according to (24), wherein the information is recorded by shift-multiplex recording for each of the holographic recording layers over an entire surface thereof.

(26) The multilayer holographic recording medium according to (24) or (25), wherein the information is recorded by angle multiplex recording in which angular modulation is performed for each of the holographic recording layers.

(27) The multilayer holographic recording medium according to (24), wherein the information is recorded for each of the holographic recording layers to make the interference fringes therein have a phase code pattern that is different for each of the holographic recording layers.

(28) A multilayer holographic recording medium comprising a number of deposited holographic recording layers in each of which interference fringes generated by projecting an object beam and a reference beam are formed, wherein information is recorded on the respective holographic recording layers by angle multiplex recording at different angles between the holographic recording layers, and is recorded to have a phase code pattern that is different for each address in the same holographic recording layer.

(29) A manufacturing method of a multilayer holographic recording medium, the method comprising, in order to deposit a predetermined number of holographic recording layers for each of which shift-multiplex recording is performed, sequentially repeating the steps of: forming a holographic recording layer on a substrate; projecting an object beam and a reference beam onto the holographic recording layer to perform shift-multiplex recording over an entire surface of the holographic recording layer; forming a next holographic recording layer on the holographic recording layer; and projecting an object beam and a reference beam onto the next holographic recording layer to perform shift-multiplex recording over an entire surface of the next holographic recording layer, wherein the object beam and the reference beam are projected while a projection condition of one of the object beam and the reference beam is fixed and a projection condition of the other is modulated for each of the holographic recording layers to record information with Bragg's conditions different between the respective holographic recording layers.

(30) The manufacturing method of a holographic recording medium according to (29), further comprising the step of, after shift-multiplex recording is performed for the holographic recording layer and before the next holographic recording layer is formed, performing post-exposure of the holographic recording layer for which shift-multiplex recording is performed to completely consume a residual photosensitive component.

(31) The manufacturing method of a holographic recording medium according to (30), wherein the post-exposure of the holographic recording layer is performed by using incoherent light.

(32) The manufacturing method of a holographic recording medium according to (29), (30), or (31), further comprising the step of forming a spacer layer between the respective holographic recording layers, for suppressing optical interference between the respective holographic recording layers and compensating for flatness, parallelism, and mechanical strength of the respective holographic recording layers.

(33) The manufacturing method of a multilayer holographic recording medium according to any one of (29) to (32), wherein a predetermined number of holographic recording layers for which shift-multiplex recording and phase-code-multiplex recording are performed are deposited by sequentially repeating the steps of: forming the holographic recording layer on the substrate; projecting the reference beam to which a phase code pattern different for each address is provided and the object beam onto the holographic recording layer to achieve shift-multiplex recording over an entire surface of the holographic recording layer; forming a next holographic recording layer on the holographic recording layer; and projecting the object beam having an incident angle modulated and the reference beam to which a phase code pattern different for each address is provided onto the next holographic recording layer to achieve shift-multiplex recording over an entire surface of the next holographic recording layer.

BEST MODE FOR CARRYING OUT THE INVENTION

In the best mode of the present invention, for a multilayer holographic recording medium including a number of deposited holographic recording layers in each of which interference fringes can be formed, shift-multiplex recording for each holographic recording layer and angle multiplex recording in a thickness direction are performed by changing an irradiation angle of an object beam for each holographic recording layer and using a common reference beam. During reproduction, a laser beam for reproduction having the same projection condition as that of the abovementioned reference beam is made incident on the multilayer holographic recording medium to cause simultaneous generation of diffraction beams from the respective holographic recording layers toward different directions, and those diffraction beams are detected by separate two-dimensional photodetectors, respectively. In this manner, a number of (that is equal to the number of the holographic recording layers) pieces of information can be simultaneously reproduced, thereby achieving the above object.

Hereinafter, a first embodiment of the present invention will be described in detail with reference to the drawings.

First, a basic principle of a multilayer holographic recording and reproducing method of the present invention is described with reference to FIG. 1 and FIG. 2.

Figure 1:
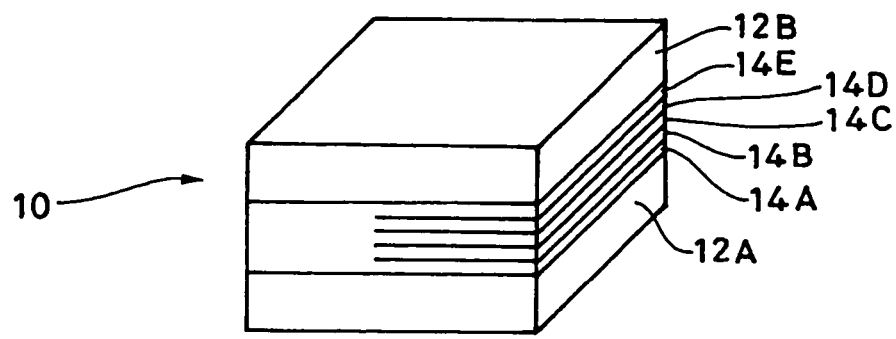
FIG. 1 is a perspective view schematically showing a multilayer holographic recording medium according to a first embodiment of the present invention.
Figure 2:
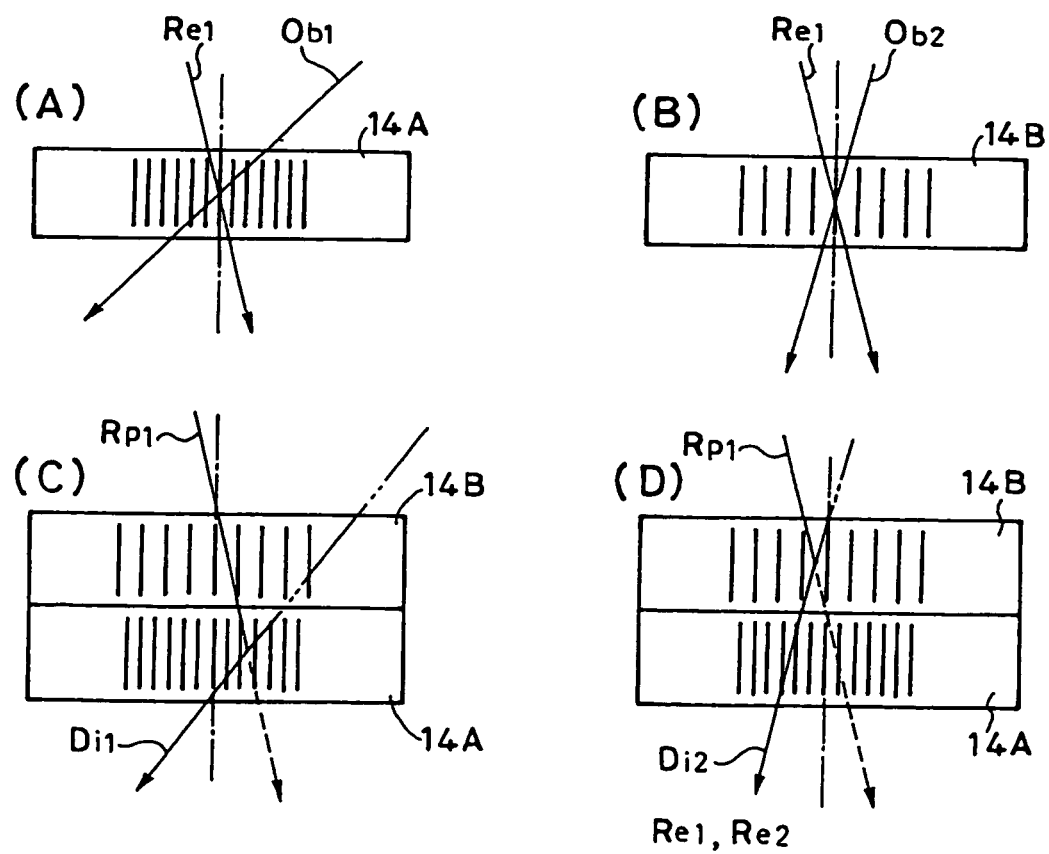
FIG. 2 includes enlarged cross-sectional views schematically showing the relationship between holographic recording layers of the multilayer holographic recording medium and a reference beam and an object beam.

A multilayer holographic recording medium 10 shown in FIG. 1 is formed by interposing a recording layer 14 including a number of deposited holographic recording layers 14A, 14B, . . . between a pair of substrates 12A and 12B formed of glass, for example.

In the respective holographic recording layers 14A, 14B, . . . of the recording layer 14, interference fringes of a common reference beam $Re_1$ and each of object beams $Ob_1$, $Ob_2$, . . . having different irradiation angles between the holographic recording layers are recorded at the same position along a surface of each recording layer (see FIGS. 2(A) and (B)).

When a laser beam for reproduction $Rp_1$ having the same projection condition as that of the abovementioned reference beam $Re_1$ is made incident on the multilayer holographic recording medium 10 in which the holographic recording layers 14A and 14B in which the interference fringes are formed under the aforementioned condition are deposited, as shown in FIGS. 2(C) and (D), a diffraction beam $Di_2$ is generated in the holographic recording layer 14B located on a side on which the laser beam for reproduction Rp is incident in FIGS. 2(C) and (D). Moreover, a 0-th order light beam (transmission beam) of the holographic recording layer 14B is incident on the next holographic recording layer 14A, thereby generating a diffraction beam $Di_1$. In this manner, diffraction beams $Di_1$, $Di_2$, . . . are generated in the respective holographic recording layers 14A, 14B.

Those diffraction beams $Di_1$, $Di_2$, . . . have the same outgoing directions as those of the object beams $Ob_1$, $Ob_2$, $Ob_2$, . . . used for recording, respectively. In other words, the diffraction beams from the holographic recording layers 14A, 14B, . . . are different in outgoing directions from one another.

Figure 3:
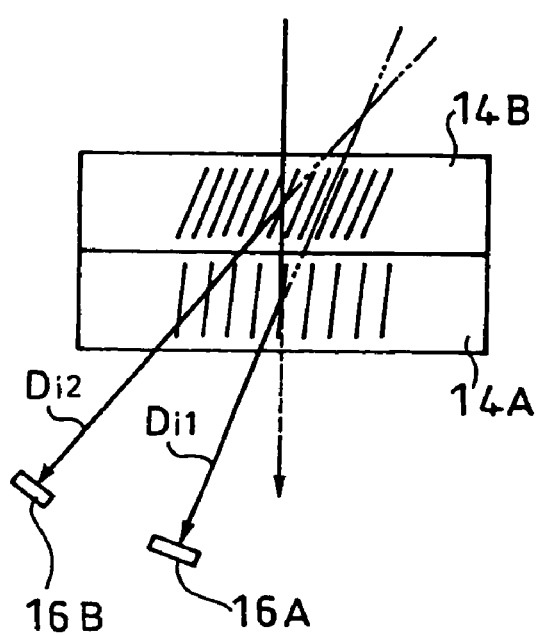
FIG. 3 includes enlarged cross-sectional views schematically showing a state of diffraction beam when a laser beam for reproduction is incident on the holographic recording layers in the first embodiment.
Figure 3:
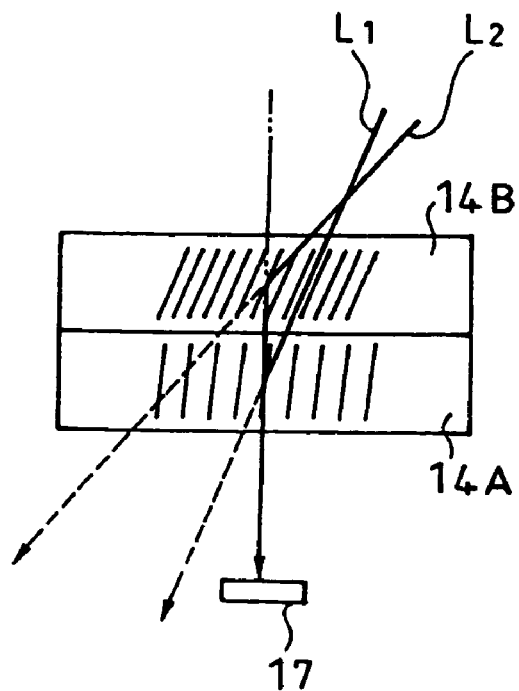

Therefore, if two-dimensional photodetectors 16A, 16B, . . . each of which is formed by CCD, for example, for individually detecting each of the diffraction beams $Di_1$, $Di_2$, . . . , are provided, as shown in FIG. 3(A), it is possible to detect the respective diffraction beams and simultaneously reproduce the pieces of information respectively recorded on the plurality of holographic recording layers 14A, 14B, . . . .

When a common object beam is used and the projection condition of the reference beam is changed for each holographic recording layer during holographic recording for the above holographic recording layers 14A, 14B, diffraction beams traveling in the same direction as the object beam used for recording can be obtained by the projection of laser beams for reproduction $L_1$ and $L_2$ corresponding to the respective reference beam beams during reproduction, as shown in FIG. 3(B). Therefore, pieces of information recorded on the respective holographic recording layers can be reproduced by means of a single two-dimensional photodetector 17. In this case, it is not possible to perform simultaneous reproduction. Instead, sequential reproduction is performed.

A process and for manufacturing the multilayer holographic recording medium 10 described above while recording information on that recording medium 10 by a manufacturing method according to a second embodiment as well as a recording and reproducing apparatus are now described.

Figure 4:
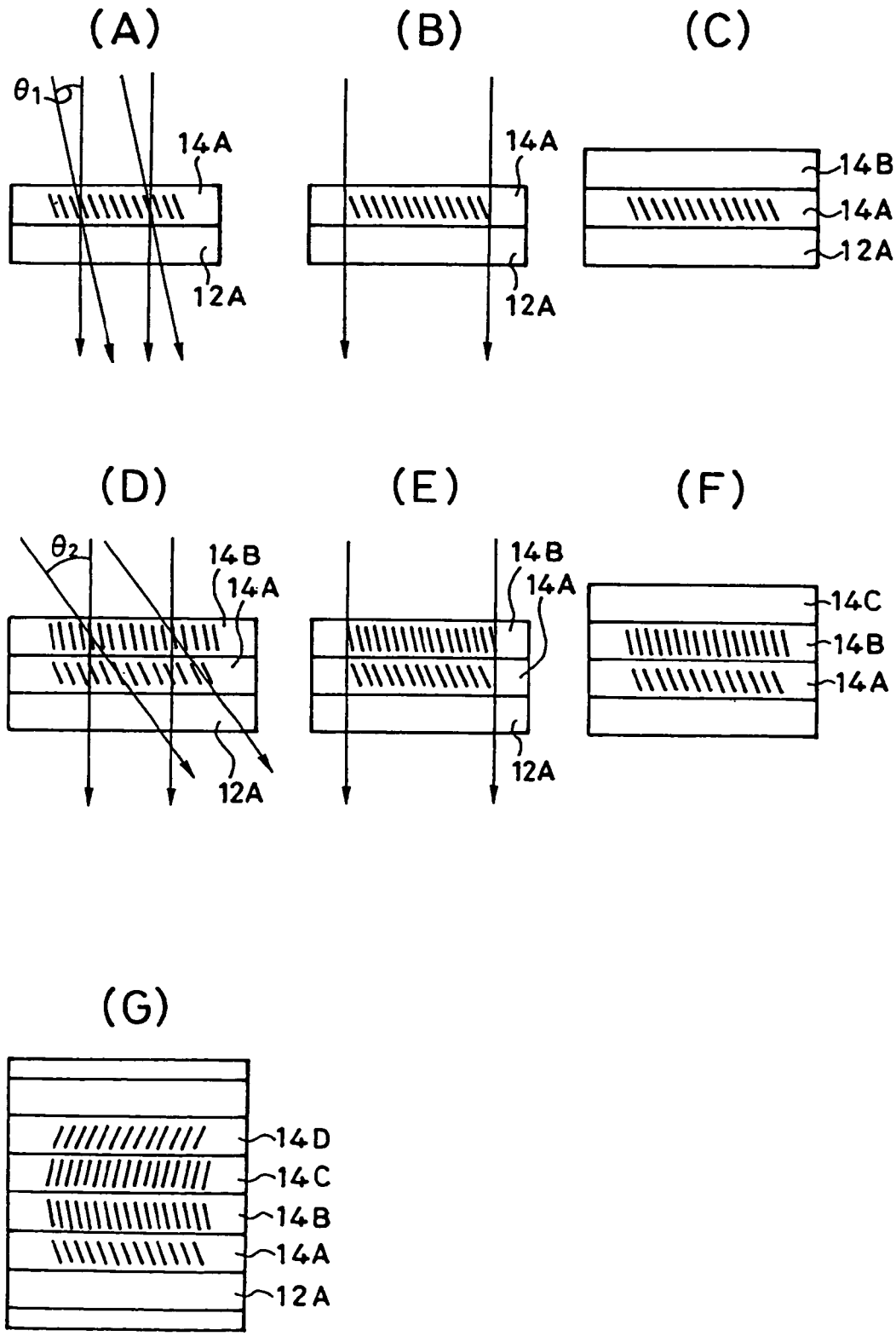
FIG. 4 includes enlarged cross-sectional views schematically showing a manufacturing method of a holographic recording medium according to a second embodiment of the present invention.

First, a holographic recording layer 14A is formed on a substrate 12A, as shown in FIG. 4(A). Then, a reference beam from a direction perpendicular to the substrate 12A and a surface of the holographic recording layer 14A and an object beam incident at an angle of $\theta_1$ with respect to the reference beam are projected onto the holographic recording layer 14A, for example, thereby forming interference fringes of the reference beam and the object beam. In this formation of the interference fringe, as shown in FIG. 5(A), the projection of the object beam and the reference beam is performed by using a multilayer holographic recording apparatus 20, while the substrate 12A with the holographic recording layer 14A formed thereon is rotated by means of a motor 22. In this manner, shift-multiplex recording is performed.

Then, as shown in FIG. 4(B), post-exposure is performed for the holographic recording layer 14A, so as to completely consume residual photosensitive components. In this post-exposure (including post-exposure in a post-process), a light source that is the same as that used for recording or reproduction may be used. However, it is preferable to use a more incoherent light source (a white light, LEDs, or the like) from the viewpoint of uniform exposure.

The reason for using the incoherent light source is to prevent unwanted unevenness of an intensity distribution from being recorded due to interference between incident light, light diffracted or scattered by a grating, light reflected by an interface, and the like.

Then, a next holographic recording layer 14B is formed on the holographic recording layer 14A for which the post-exposure is finished, as shown in FIG. 4(C). A spacer layer may be provided between the holographic recording layers 14A and 14B in order to suppress optical interference between the respective recording layers and improve flatness, parallelism, and optical intensity characteristics of the recording layers. The formation of the spacer layer may be performed before or after recording for the recording layer 14A.

As shown in FIG. 4(D), shift-multiplex recording is performed for the abovementioned holographic recording layer 14B in a similar manner to that for the abovementioned holographic recording layer 14A by using the common reference beam with that shown in FIG. 4(A) and setting an incident angle of the object beam to $\theta_2$ as shown in FIG. 5(B), so as to make a Bragg's condition different from that of the interference fringe in the holographic recording layer 14A. Therefore, shift-multiplex recording is performed for each holographic recording layer throughout that holographic recording layer.

For simplifying the description, FIGS. 4(A) to (D) show a plane grating (interference fringes) formed by parallel light beams. However, in case of shift-multiplex recording, a grating like a curved surface formed by spherical waves is actually obtained.

After information is recorded on the holographic recording layer 14B, post-exposure is performed for the holographic recording layer 14B, as shown in FIG. 4(E), as in the case of the abovementioned holographic recording layer 14A.

Figure 6:
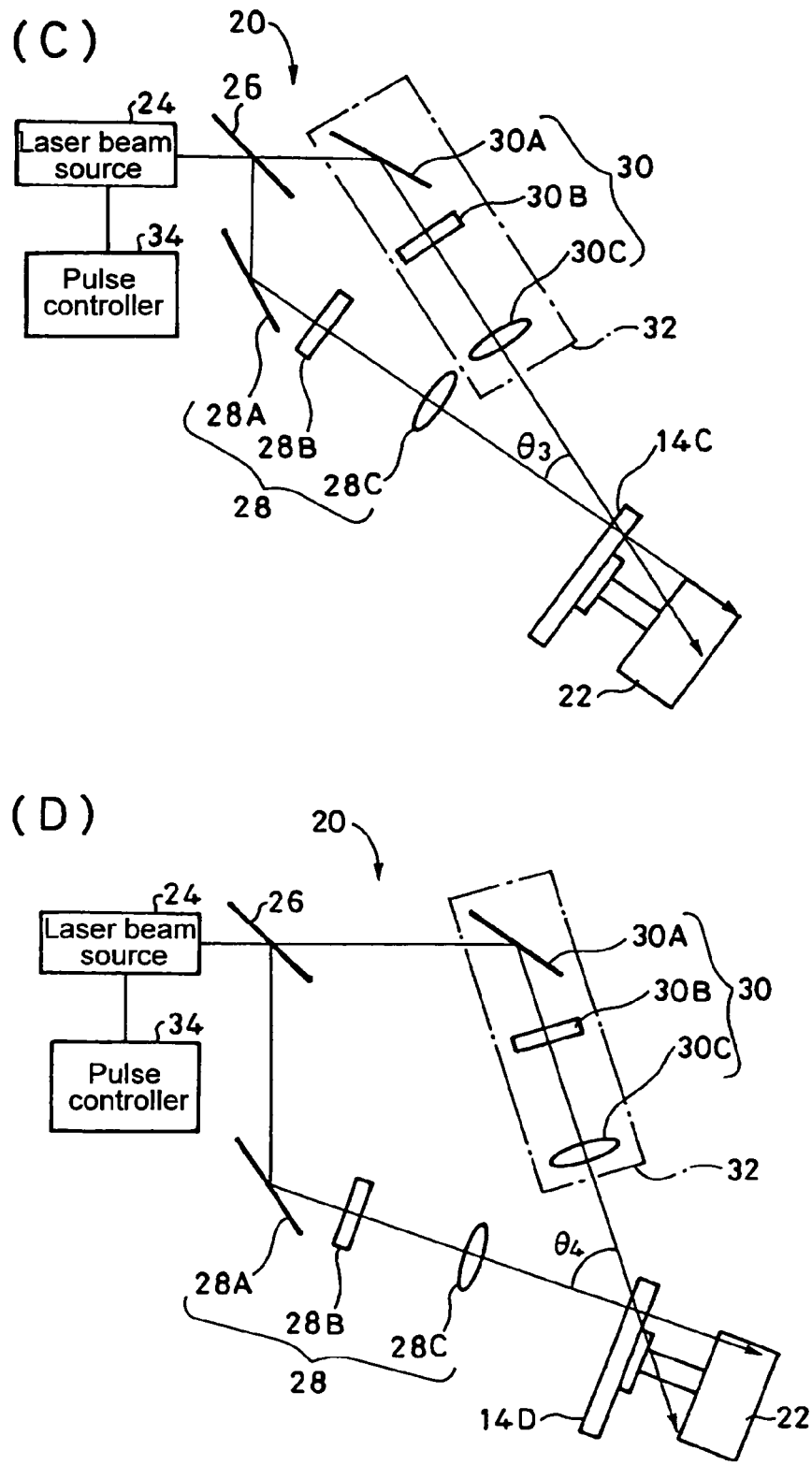
FIG. 6 includes optical system diagrams showing states in which the multilayer holographic recording apparatus shown in FIG. 5 is changed.

Furthermore, after that post-exposure is finished, the object beam having a different incident angle $\theta_3$ (see FIG. 6(C)) from those for the abovementioned holographic recording layers 14A and 14B (the reference beam is common with the holographic recording layers 14A and 14B) is projected on a holographic recording layer 14C, thereby performing shift-multiplex recording of information by interference fringes.

In this manner, a desired number of holographic recording layers are deposited (this embodiment shows four-layered structure), gratings are formed, and post-exposure is performed (see FIGS. 4(F) and (G)). Onto the last holographic recording layer 14D, the object beam is projected at an incident angle $\theta_4$, as shown in FIG. 6(D). After post-exposure, a protective layer 18 is formed on the holographic recording layer 14D. An anti-reflection layer is entirely formed on both sides of the recording medium, if necessary.

Figure 5:
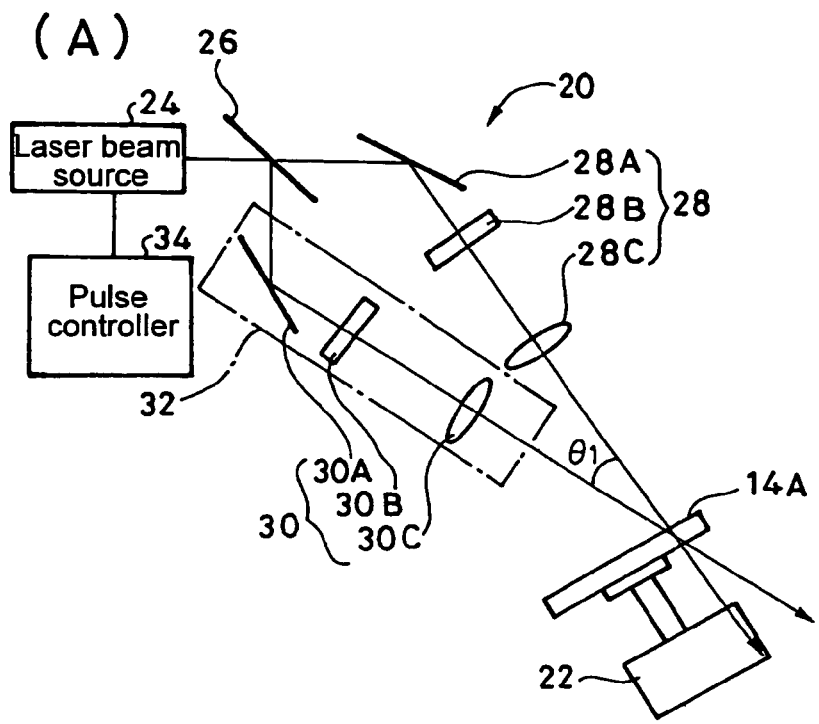
FIG. 5 includes optical system diagrams of a multilayer holographic recording apparatus used in the above manufacturing method and holographic recording.
Figure 5:
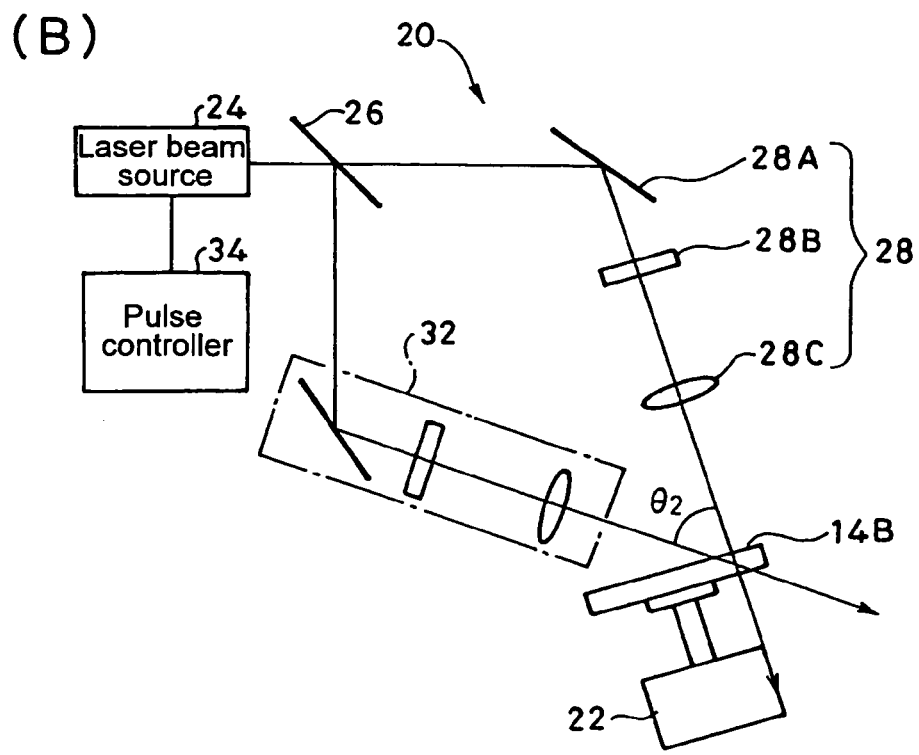

Next, the multilayer holographic recording apparatus 20 shown in FIG. 5 will be described.

The multilayer holographic recording apparatus 20 is configured to include: a laser beam source 24; a polarization beam splitter 26 that transmits one of linearly polarized light beams of laser light from the laser beam source 24, each having an orthogonal vibration plane to one another, e.g., a p-polarized light component and reflects an s-polarized light component; a reference optical system 28 that directs the p-polarized light component transmitted through the abovementioned polarization beam splitter 26 to the abovementioned substrate 12A and the holographic recording layers deposited thereon; and an object optical system 30 that directs the s-polarized light component reflected from the polarization beam splitter 26 to the abovementioned substrate 12A and the holographic recording layers deposited thereon. For convenience of description, in FIGS. 6(C) and (D), the p-polarized light component transmitted through the abovementioned polarization beam splitter 26 is used as an object beam and the reflected s-polarized light component is used as a reference beam.

The abovementioned reference optical system 28 includes a mirror 28A, a half-wave plate 28B, and a condenser lens 28C in this order from a side close to the abovementioned polarization beam splitter 26. The abovementioned object optical system 30 includes a mirror 30A, a spatial light modulator 30B, and a Fourier lens 30C which are arranged in this order from the side of the polarization beam splitter 26.

The abovementioned object optical system 30 is entirely supported by an incident angle modulator 32 that can modulate an incident angle of the object beam with respect to the holographic recording layer (an angle with respect to an optical axis of the reference beam). The mirror 30A is supported by the incident angle modulator 32 in a state in which a reflection angle of the mirror 30A can be adjusted.

The numeral 34 in FIGS. 5(A), (B), 6(C), and (D) denotes a pulse controller for controlling pulse-like light emission of the laser beam source 24.

Next, a multilayer holographic memory reproducing apparatus 36 for reproducing information that is recorded on the abovementioned multilayer holographic recording medium 10 in a holographic manner is described with reference to FIG. 7.

The multilayer holographic memory reproducing apparatus 36 is configured to include: a laser beam source 38 that emits laser beams having the same wavelength as the laser beam source 24 in the abovementioned multilayer holographic recording apparatus 20; a reproducing laser optical system 40 for directing a laser beam for reproduction emitted from the laser beam source 38 to the multilayer holographic recording medium 10 under the same projection condition (incident angle) as that of the reference beam in the reference optical system 28 in the multilayer holographic recording apparatus 20; a motor (not shown) for driving (shifting) the multilayer holographic recording medium 10; and two-dimensional photodetectors 16A, 16B, 16C, and 16D for detecting diffraction beams generated in the respective holographic recording layers 14A to 14D by projecting the laser beam for reproduction onto the abovementioned multilayer holographic recording medium 10.

The abovementioned reproducing laser optical system 40 includes a mirror 40A for reflecting the laser beam for reproduction from the laser beam source 38 toward the multilayer holographic recording medium 10, and a condenser lens 40B provided between the mirror 40A and the multilayer holographic recording medium 10.

Moreover, imaging lenses 44A, 44B, 44C, and 44D are provided on optical paths of the diffraction beams from the abovementioned multilayer holographic recording medium 10 to the two-dimensional photodetectors 16A, 16B, 16C, and 16D, respectively. The numeral 39 in FIG. 7 denotes a pulse controller for controlling the laser beam source 38.

In this embodiment, the laser beam for reproduction is converged by the condenser lens 40B and is then incident on the multilayer holographic recording medium 10. The laser beam for reproduction has the same wavelength as the abovementioned reference beam used for recording and is also incident on the multilayer holographic recording medium 10 at the same incident angle as the abovementioned reference beam. Therefore, in the holographic recording layer 14D, a diffraction beam traveling in the same direction as that of the object beam in FIG. 6(D) is generated.

The two-dimensional photodetector 16D detects this diffraction beam via the imaging lens 44D. Therefore, a reproduced image is decoded to obtain reproduced information.

The laser beam for reproduction transmitted through the holographic recording layer 14D (i.e., 0-th order diffraction beam) serves as a laser beam for reproduction for the next holographic recording layer 14C. Therefore, a diffraction beam is generated in the holographic recording layer 14C, too, and is detected by the two-dimensional photodetector 16C.

In this manner, diffraction beams are also generated in the holographic recording layers 14B and 14A toward their corresponding two-dimensional photodetectors 16B and 16A because of 0-th order diffraction beams incident from their upper layers, respectively.

Since multiplex recording of volume hologram (shift-multiplex recording in this embodiment) is independently performed in each of the holographic recording layers 14A, 14B, 14C, and 14D, diffraction efficiency for each unit of hologram is as low as approximately $10^{-4}$. Although the number of the holographic recording layers is four for convenience of description in this embodiment, the number of the holographic recording layers may be more than four. For example, even in the case where 100 holographic recording layers are deposited, a laser beam for reproduction that reaches the lowermost layer is reduced only by $10^{-4} \times 100 = 0.01$, i.e., approximately 1% as compared with laser beam for reproduction that reaches the first holographic recording layer 14A. Therefore, intensities of diffraction beams obtained from the respective holographic recording layers 14A, 14B, . . . are approximately the same.

In the above description, the diffraction beams are generated in the holographic recording layers 14D to 14A one by one. However, the diffraction beams are actually generated in the respective holographic recording layers at the same time. Therefore, pieces of reproduced information obtained by the two-dimensional photodetectors 16A to 16D are also obtained at the same time. Therefore, an information transfer rate is dramatically increased as compared with a case of sequential reproduction.

Moreover, it is not necessary to mechanically drive a recording optical system and a reproducing optical system in a direction of an optical axis when information is recorded on each holographic recording layer and is reproduced from each holographic recording layer. Therefore, resolution is not affected by mechanical precision and therefore recording density can be largely improved.

Next, a multilayer holographic memory reproducing apparatus 50 according to a third embodiment is described with reference to FIGS. 8 and 9.

In the second embodiment, the reference beam is fixed to be incident on the multilayer holographic recording medium 10 perpendicularly thereto and the incident angle of the object beam is modulated. On the contrary, in the third embodiment, information on a multilayer holographic recording medium 51, for which shift-multiplex recording (angle multiplex recording in a direction of deposition of layers) is performed by making the object beam incident on the holographic recording medium perpendicularly thereto and modulating the incident angle of the reference beam, is reproduced.

A principle of information reproduction of the multilayer holographic memory reproducing apparatus 50 is described. As shown in FIG. 8, laser beams for reproduction $Rp_1$, $Rp_2$, $Rp_3$, and $Rp_4$ are made incident on the respective holographic recording layers at angles different from each other, and the multilayer holographic recording medium 51 is driven in a similar manner to that during shift-multiplex recording. Diffraction beams thus generated are detected by a two-dimensional photodetector 52.

Figure 9:
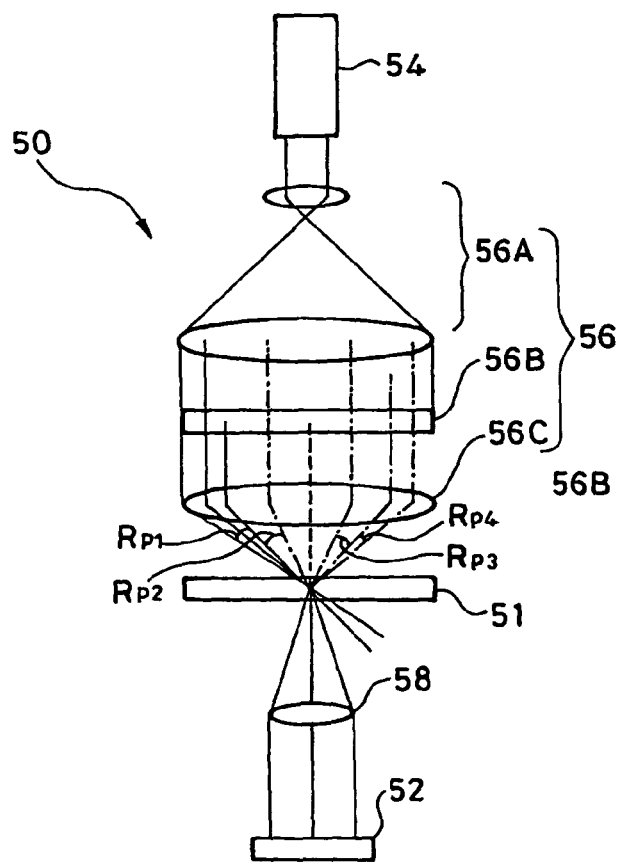
FIG. 9 is an optical system diagram showing details of the multilayer holographic memory reproducing apparatus of the third embodiment.

More specifically, as shown in FIG. 9, the multilayer holographic memory reproducing apparatus 50 is configured to include a laser beam source 54, a reproduction laser optical system 56 for projecting a laser beam for reproduction from the laser beam source 54 onto the multilayer holographic recording medium 51, and the abovementioned two-dimensional photodetector 52.

The abovementioned reproducing laser optical system 56 is configured to include: a beam expander 56A for enlarging a beam diameter of the laser beam for reproduction emitted from the laser beam source 54; a spatial light modulator 56B that modulates the laser beam for reproduction having the enlarged beam diameter by spatial light modulation so as to make a part of the laser beam for reproduction incident on the holographic recording layers in the abovementioned multilayer holographic recording medium 51 from a different position within the enlarged beam diameter; and a condenser lens 56C that condenses parallel light from the spatial light modulator 56B within the multilayer holographic recording medium 51.

Figure 8:
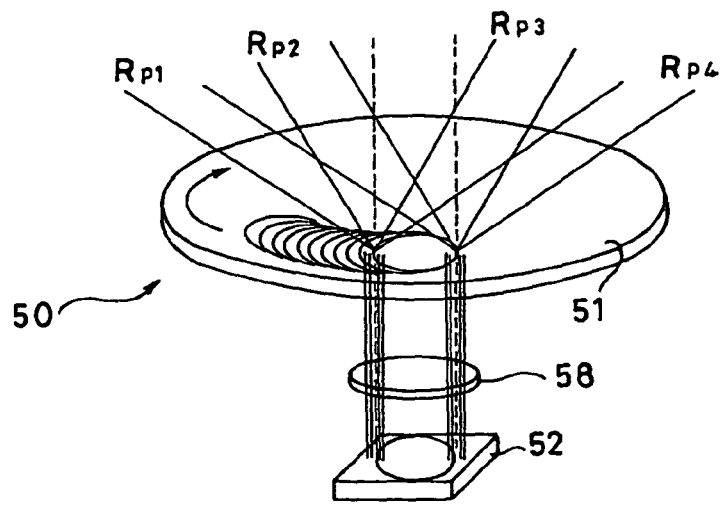
FIG. 8 is a simplified perspective view showing a multilayer holographic memory reproducing apparatus according to a third embodiment.

The numeral 58 in FIGS. 8 and 9 denotes an imaging lens provided between the abovementioned multilayer holographic recording medium 51 and the two-dimensional photodetector 52.

In the multilayer holographic memory reproducing apparatus 50 of the third embodiment, the spatial light modulator 56B partially transmits the laser beam for reproduction, and that transmitting part varies in accordance with the reference beam for each of the holographic recording layers of the multilayer holographic recording medium 51. In this manner, the multilayer holographic memory reproducing apparatus 50 makes laser beams for reproduction $Rp_1$, $Rp_2$, $Rp_3$, and $Rp_4$ incident on the multilayer holographic recording medium 51 at different incident angles from each other, respectively, as shown in FIG. 8.

Therefore, when a reproduction beam corresponding to a holographic recording layer is incident, only a reproduction image corresponding to this reproduction beam is obtained. The reproduction images obtained from the respective holographic recording layers are imaged at the same position, i.e., a position of the two-dimensional photodetector 52.

In the third embodiment, only a single pair of a detection optical system for detecting diffraction beam from the multilayer holographic recording medium 51 and the two-dimensional photodetector 52 is enough. Therefore, the apparatus can be configured with a simple structure and a volume of the apparatus can be made small.

Figure 10:
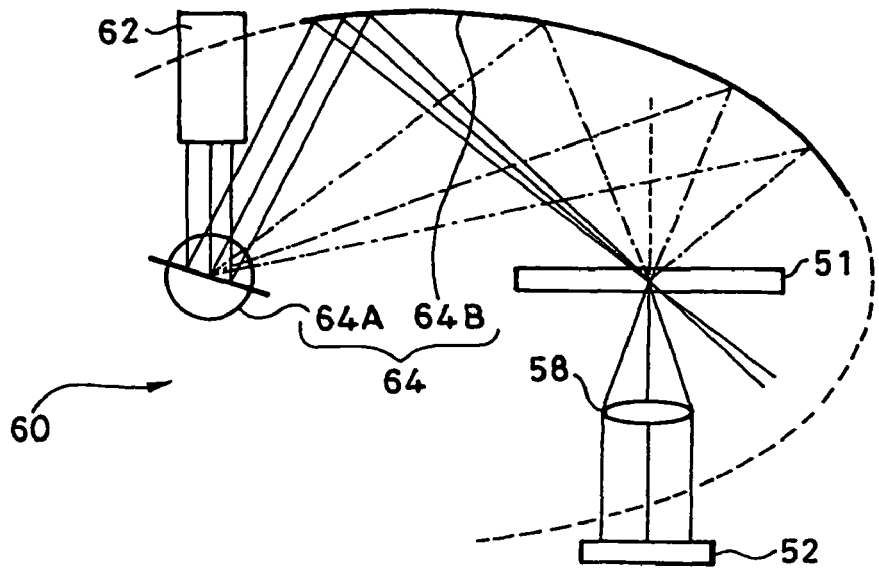
FIG. 10 is an optical system diagram showing a multilayer holographic memory reproducing apparatus according to a fourth embodiment.

Next, a holographic memory reproducing apparatus 60 according to a fourth embodiment shown in FIG. 10 is described.

In the third embodiment, if there are a large number of holographic recording layers in the multilayer holographic recording medium 51, a ratio of a part blocked by the spatial light modulator 56B to the entire laser beams for reproduction becomes large, therefore lowering use efficiency of the laser beam for reproduction.

Therefore, the holographic memory reproducing apparatus 60 of the fourth embodiment is configured to prevent lowering of the use efficiency of the laser beam for reproduction even if there are a large number of holographic recording layers.

The holographic memory reproducing apparatus 60 is configured to include: a laser beam source 62; an angle modulator 64 for a laser beam for reproduction that reflects a laser beam for reproduction emitted from the laser beam source 62 to make it incident on the multilayer holographic recording medium 51 at an angle that is changed to correspond to the holographic recording layer of the multilayer holographic recording medium 51; and the two-dimensional photodetector 52 and the imaging lens 58 that are the same as those in the abovementioned multilayer holographic memory reproducing apparatus 50 shown in FIGS. 8 and 9.

The angle modulator 64 for a laser beam for reproduction is configured to include: a rotating mirror 64A for reflecting a laser beam emitted from the laser beam source 62; and a concave mirror 64B formed to reflect the laser beam for reproduction reflected by the rotating mirror 64A toward a predetermined position within the multilayer holographic recording medium 51 in accordance with an incident angle of the laser beam for reproduction.

A specific shape of the concave mirror 64B is an inner circumferential surface of a part of an elliptic cylinder and is configured in such a manner that two foci of the ellipsoid are coincident with a center of rotation of the rotating mirror 64A and an irradiation point on the multilayer holographic recording medium 51 at which the laser beam for reproduction is projected on the multilayer holographic recording medium 51.

Therefore, the laser beam for reproduction that is incident on the rotating mirror 64A located at one focus of the ellipsoid, is reflected by the rotating mirror 64A, and is further reflected by the concave mirror 64B is always incident on the other focus of the ellipsoid, i.e., the point where the laser beam for reproduction is projected onto the multilayer holographic recording medium 51.

In the fourth embodiment, an angle of rotation of the rotating mirror 64A is controlled so as to modulate a position of a reflection point on the concave mirror 64B from which the laser beam for reproduction reflected by the rotating mirror 64A is reflected. Due to this, the incident angle of the laser beam for reproduction on the multilayer holographic recording medium 51 is adjusted for each of the holographic recording layers.

Moreover, the concave mirror 64B also serves as a condenser lens and the laser beam for reproduction projected onto the multilayer holographic recording medium 51 has a curved wave surface. Therefore, it is possible to perform shift-multiplex recording by driving the multilayer holographic recording medium 51 in a predetermined direction.

Figure 7:
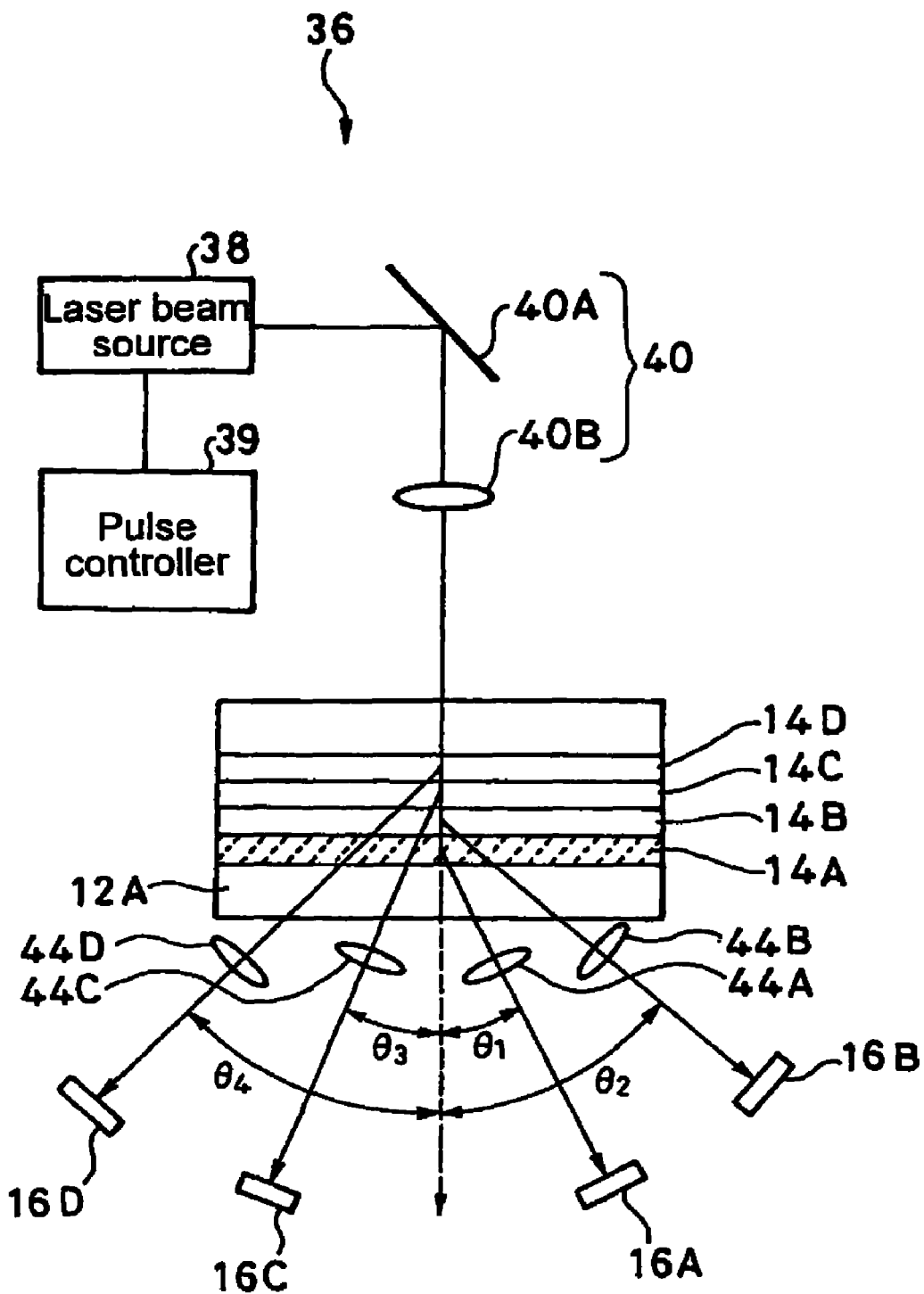
FIG. 7 is an optical system diagram showing a multilayer holographic memory reproducing apparatus for reproducing information from a holographic recording medium which is manufactured by the above manufacturing method and for which recording is performed by the above multilayer holographic recording apparatus.

In the fourth embodiment, the use efficiency of the laser beam for reproduction is approximately equal to that in the second embodiment shown in FIG. 7. However, both of the recording density and the data transfer rate are improved in the second embodiment, whereas only the recording density is improved in the fourth embodiment. On the other hand, the fourth embodiment has an advantage that a detection optical system can be configured with a simple structure.

Figure 11:
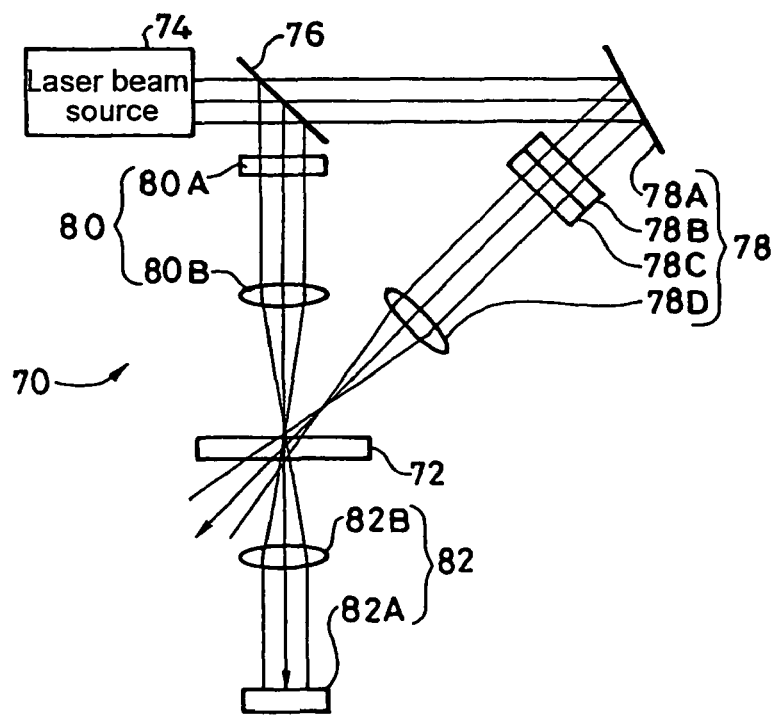
FIG. 11 is an optical system diagram of a multilayer holographic recording and reproducing apparatus according to a fifth embodiment.
Figure 12:
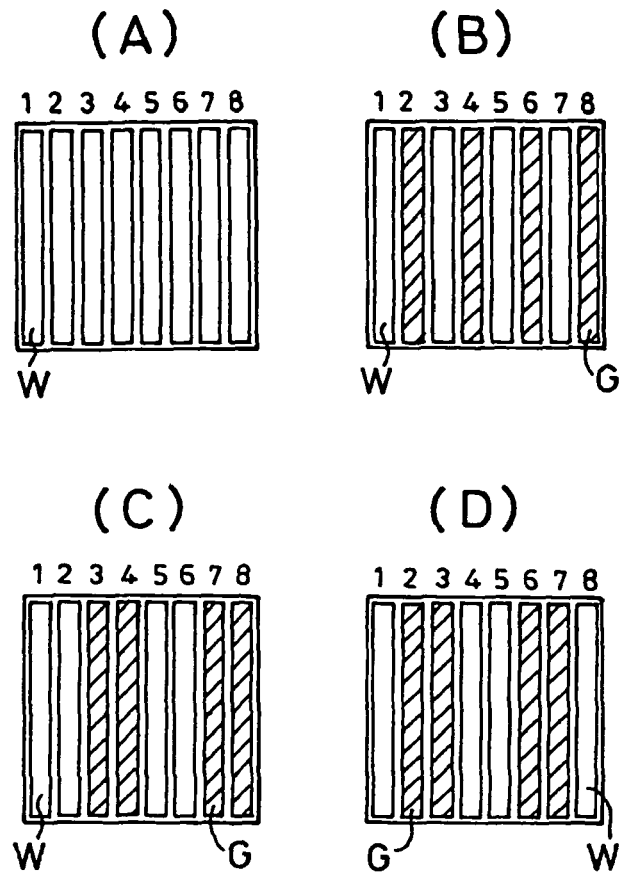
FIG. 12 includes enlarged plan views showing exemplary phase code patterns in the fifth embodiment.

Next, a multilayer holographic recording and reproducing apparatus 70 according to a fifth embodiment of the present invention is described with reference to FIG. 11 to 13.

The multilayer holographic recording and reproducing apparatus 70 performs shift-multiplex recording in a direction of movement of a multilayer holographic recording medium 72 and phase-code-multiplex recording in a direction of deposition of holographic recording layers, and also performs reproduction.

The multilayer holographic recording and reproducing apparatus 70 is configured to include: a laser beam source 74; a polarization beam splitter 76 that transmits one of two linearly polarized light beams each having an orthogonal vibration plane to another, e.g., a p-polarized light beam, of a laser beam for reproduction emitted from the laser beam source 74 and reflects an s-polarized light beam; a reference optical system 78 that directs the laser beam transmitted through the polarization beam splitter 76 as a reference beam to the abovementioned multilayer holographic recording medium 72; an object optical system 80 that directs the reflected s-polarized light beam to the multilayer holographic recording medium 72; and a detection optical system 82 for detecting a diffraction beam generated by the projection of the laser beam for reproduction onto the multilayer holographic recording medium 72.

The abovementioned reference optical system 78 is configured to include a mirror 78A, a half-wave plate 78B, a phase spatial light modulator 78C, and a Fourier lens 78D which are arranged in this order from the side of the abovementioned polarization beam splitter 76.

The abovementioned object optical system 80 is configured to include a spatial light modulator 80A and a Fourier lens 80B which are arranged in this order from the side of the abovementioned polarization beam splitter 76.

The abovementioned detection optical system 82 is configured to include a two-dimensional photodetector 82A and an imaging lens 82B that is provided between the two-dimensional photodetector 82A and the abovementioned multilayer holographic recording medium 72.

The phase spatial light modulator 78C of the abovementioned reference optical system 78 is a device that modulates a phase of light passing therethrough by pixel. In this embodiment, it is assumed that the phase spatial light modulator 78C performs one-dimensional 8-pixel modulation, as shown in FIG. 12(A), for simplifying the description. More specifically, the phase spatial light modulator 78C provides a part or all of the abovementioned eight pixels with a phase difference of $\pi$. For example, as shown in FIGS. 12(A) to (D), the phase spatial light modulator 78C is configured to provide a phase difference of $\pi$ between white pixels W and hatched pixels G.

The spatial light modulator 80A of the abovementioned object optical system 80 modulates the intensity of the object beam in accordance with data to be recorded.

A process for recording information on the multilayer holographic recording medium 72 by means of the multilayer holographic recording and reproducing apparatus 70 will be described.

A p-polarized light beam of a laser beam for reproduction emitted from the laser beam source 74 is transmitted through the polarization beam splitter 76 and is then incident on the reference optical system 78. An s-polarized light beam thereof is reflected by the polarization beam splitter 76 and is then incident on the object optical system 80.

The p-polarized light beam incident on the abovementioned reference optical system 78 is reflected by the mirror 78A, is converted into an s-polarized light beam by the half-wave plate 78B, and is then incident on the abovementioned phase spatial light modulator 78C.

The phase spatial light modulator 78C modulates a phase of a laser beam passing therethrough by one-dimensional 8-pixel modulation, as shown in FIGS. 12(A) to (D), for example, as described above.

The reference beam having the modulated phase is condensed by the Fourier lens 78D to a position near the multilayer holographic recording medium 72 and an intensity distribution of that reference beam is transformed by Fourier transform. Then, the reference beam is projected onto the multilayer holographic recording medium 72.

On the other hand, the object beam that is the s-polarized light beam reflected by the abovementioned polarization beam splitter 76 is provided with data by the intensity modulation in the spatial light modulator 80A. Then, the object beam is condensed by the Fourier lens 80B and an intensity distribution of the object beam is transformed by Fourier transform. Then, the object beam crosses the reference beam projected onto the multilayer holographic recording medium 72 within the multilayer holographic recording medium 72.

Since both the abovementioned reference beam and object beam are s-polarized light beams, optical interference occurs in a region where they cross each other and is recorded as a diffraction grating on the multilayer holographic recording medium 72. Recording achieved in this manner is performed for each of the holographic recording layers of the multilayer holographic recording medium 72, thereby achieving shift-multiplex recording.

Figure 13:
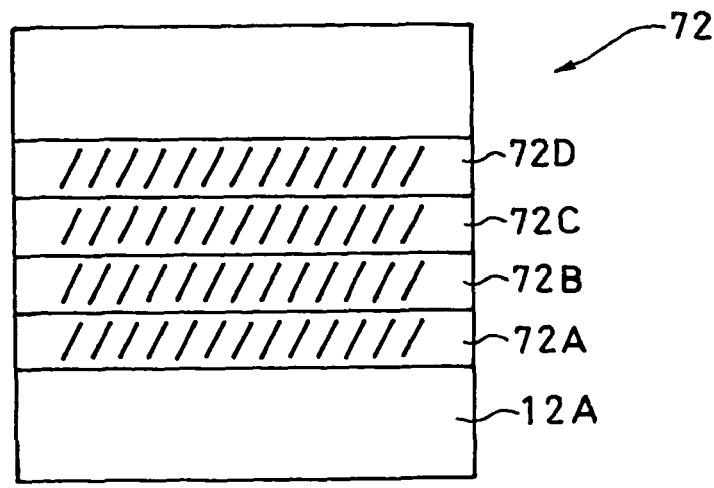
FIG. 13 is an enlarged cross-sectional view schematically showing a multilayer holographic recording medium in which interference fringes are formed by the apparatus of the fifth embodiment.

If the number of the holographic recording layers in the abovementioned multilayer holographic recording medium 72 is four for simplifying the description, as shown in FIG. 13, each of interference fringes respectively recorded on first to fourth holographic recording layers 72A, 72B, 72C, and 72D that are arranged in this order from the side of the substrate 12A contains any of phase code patterns of one-dimensionally arranged eight pixels that are shown in FIGS. 12(A) to (D), respectively, for example. Wolsh Hadamard orthogonal code containing eight components in one dimension is used as the phase code pattern, for example.

When reproducing information that is recorded on the multilayer holographic recording medium 72 in the aforementioned manner, a laser beam for reproduction is projected onto the multilayer holographic recording medium 72 from the abovementioned reference optical system 78 under the same condition as that of the reference beam.

In this case, when the laser beam for reproduction having a phase that is modulated with any of the phase code patterns shown in FIGS. 12(A) to (D) by the abovementioned phase spatial light modulator 78C is projected corresponding to the recording layer for which reproduction is to be performed, information recorded on the target holographic recording layer can be reproduced.

In the multilayer holographic recording and reproducing apparatus 70 of the fifth embodiment, it is not necessary to provide a mechanically movable unit for both recording and reproduction. Therefore, the recording density and the data transfer rate can be improved.

If there are a small number of holographic recording layers in the multilayer holographic recording medium 72, the abovementioned phase spatial light modulator 78C may be replaced with a phase code mask.

The phase code mask is a plate-like optical component that is transparent with respect to wavelengths in a recording and reproduction bandwidth of the laser beam for reproduction. The phase code mask provides the laser beam for reproduction passing therethrough with a fixed phase pattern. For example, a BK7 parallel plate may have a step of λ/n (λ; a wavelength of the laser beam for reproduction in vacuum, n; a refractive index of the phase code mask). Alternatively, a refractive index may be varied for each pixel, as shown in FIGS. 12(A) to (D).

Figure 14:
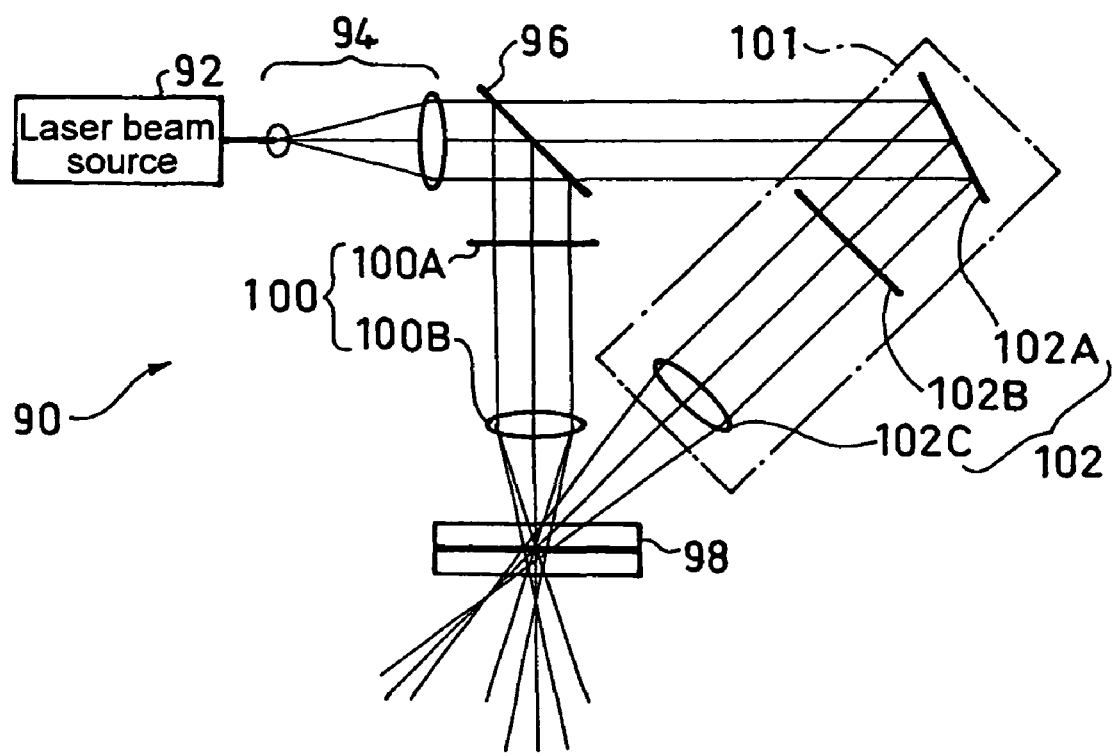
FIG. 14 is an optical system diagram showing a multilayer holographic recording apparatus according to a sixth embodiment.
Figure 15:
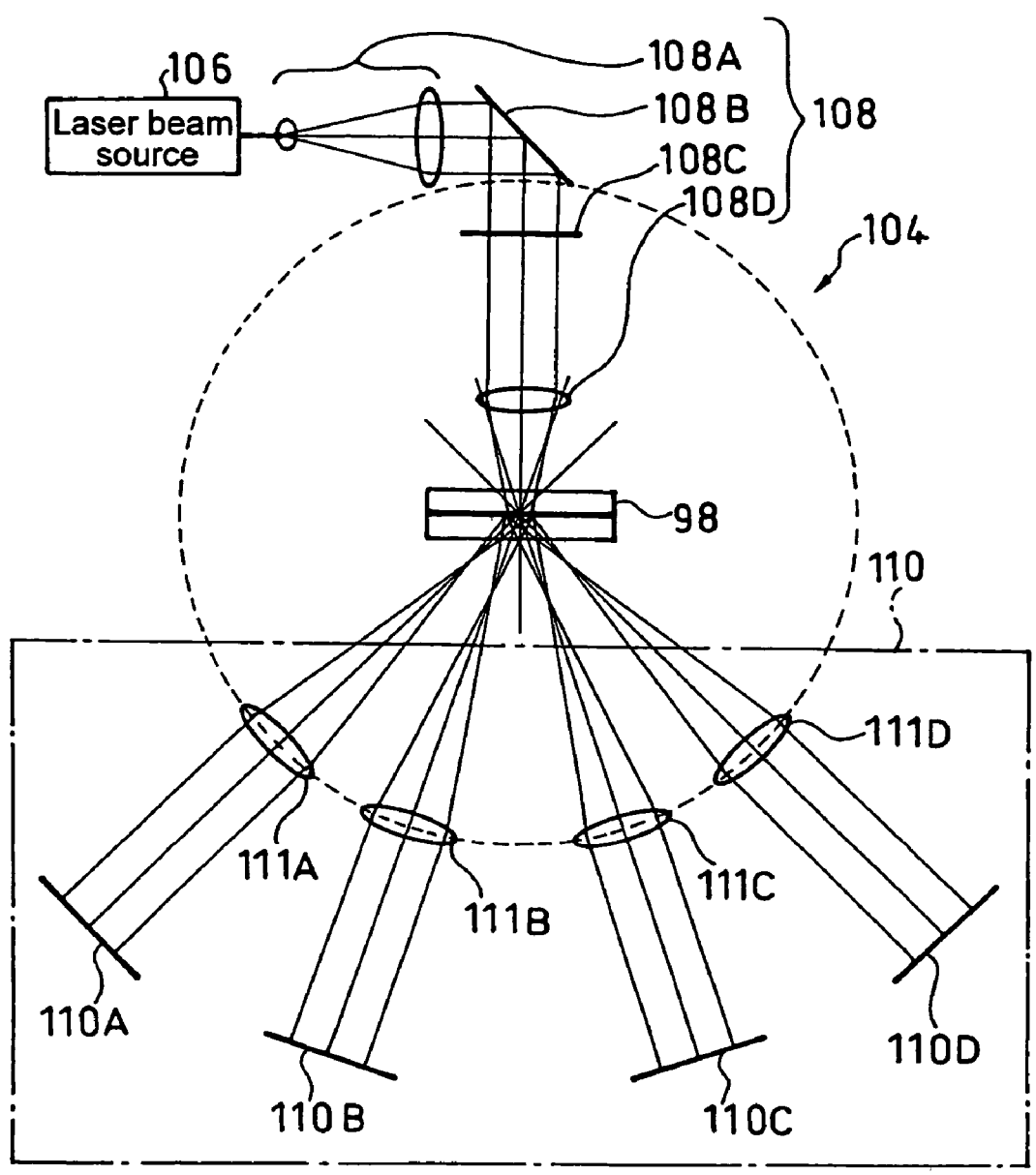
FIG. 15 is an optical system diagram of a multilayer holographic memory reproducing apparatus according to the sixth embodiment.

Next, a multilayer holographic recording apparatus that performs phase-code recording for each of holographic recording layers in a multilayer holographic recording medium and performs angle multiplex recording in a direction of deposition of the holographic recording layers by modulating an incident angle of object beam, and an apparatus for reproducing information from the multilayer holographic recording medium on which the information is recorded by the above multilayer holographic recording apparatus are described with reference to FIGS. 14 and 15 showing a sixth embodiment.

The multilayer holographic recording apparatus 90 according to the sixth embodiment is configured to include: a laser beam source 92; a beam expander 94 that enlarges a beam diameter of a laser beam emitted from the laser beam source 92; a beam splitter 96 that splits the laser beam for reproduction having the enlarged beam diameter into a transmission beam and a reflection beam; a reference optical system 100 that directs the laser beam for reproduction reflected by the beam splitter 96 to a multilayer holographic recording medium 98; and an object optical system 102 that directs the transmitted laser beam for reproduction to the multilayer holographic recording medium 98.

The abovementioned reference optical system 100 is configured to include a phase spatial light modulator 100A and a Fourier lens 100B which are arranged in this order from the side of the beam splitter 96.

The abovementioned object optical system 102 is configured to include a mirror 102A, a spatial light modulator 102B, and a Fourier lens 102C which are arranged in this order from the side of the beam splitter 96.

The abovementioned object optical system 102 is entirely attached to an incident angle modulator 101. The mirror 102A is configured in such a manner that its reflection angle is adjustable. Due to those, the object optical system 102 can modulate an incident angle of the object beam on the multilayer holographic recording medium 98 for each of the holographic recording layers. That is, angle multiplex recording can be achieved.

Next, a process for recording information on the multilayer holographic recording medium 98 by means of the multilayer holographic recording apparatus 90 will be described.

A beam diameter of a laser beam emitted from the laser beam source 92 is enlarged by the beam expander 94. Then, the laser beam is incident on the beam splitter 96.

The beam splitter 96 splits the laser beam incident thereon into a transmission beam and a reflection beam. The reflection beam is incident on the reference optical system 100 as a reference beam. The transmission beam is incident on the object optical system 102 as an object beam.

The reference beam is provided with a phase code pattern by being modulated by two-dimensional phase modulation in the phase spatial light modulator 10A, and is then condensed by passing through the Fourier lens 100B. Then, the reference beam is projected onto the multilayer holographic recording medium 98.

On the other hand, the object beam is reflected by the mirror 102A and is incident on the spatial light modulator 102B. The spatial light modulator 102B modulates the object beam by two-dimensional amplitude modulation in accordance with data (information) to be recorded. Subsequently, the object beam is condensed by the Fourier lens 102C and is projected onto the multilayer holographic recording medium 98. The abovementioned two-dimensional amplitude modulation pattern is transformed by Fourier transform at a back focus of the Fourier lens 102C.

Therefore, the object beam and the reference beam are projected onto the multilayer holographic recording medium 98 in the same region of a holographic recording layer. Consequently, a three-dimensional interference pattern is formed in this region and this interference pattern is recorded in the holographic recording layer as a refractive index change.

A set of a plurality of phase codes is used for each holographic recording layer. That is, one phase code pattern set is assigned to one holographic recording layer.

The phase code pattern may be made different for each recording layer, as described above. However, it is preferable to use a set of a plurality of phase codes for each recording layer, considering modulation efficiency of the phase code and a function of simultaneous reproduction.

Recording is performed for each holographic recording layer by using a set of a plurality of phase codes in the above-described manner and that recording is repeated for every recording layer to finish recording for all the holographic recording layers. In this manner, recording of information on the multilayer holographic recording medium 98 is finished.

Next, a multilayer holographic memory reproducing apparatus 104 for reproducing information recorded on the aforementioned multilayer holographic recording medium 98 will be described with reference to FIG. 15.

The multilayer holographic memory reproducing apparatus 104 is configured to include: a laser beam source 106; a reproducing laser optical system 108 for directing a laser beam for reproduction from the laser beam source 106 to the multilayer holographic recording medium 98; and a detection optical system 110 for reproducing information from a diffraction beam generated by the projection of the laser beam for reproduction onto the multilayer holographic recording medium 98.

The abovementioned reproducing laser optical system 108 is configured to include: a beam expander 108A for enlarging a beam diameter of the laser beam for reproduction emitted from the laser beam source 106; a mirror 108B that perpendicularly reflects the laser beam for reproduction passing through the beam expander 108A; a phase spatial light modulator 108C on which the laser beam for reproduction reflected by the mirror 108B is incident; and a Fourier lens 108D that condenses the laser beam for reproduction passing through the phase spatial light modulator 108C within the multilayer holographic recording medium 98.

The abovementioned detection optical system 110 includes two-dimensional photodetectors 110A to 110D. The two-dimensional photodetectors 110A to 110D are arranged at respective positions each of which is located on an extension of an incident optical axis of the object beam used for recording for each holographic recording layer. Moreover, imaging lenses 111A to 111D are arranged between those two-dimensional photodetectors 110A to 110D and the multilayer holographic recording medium 98, respectively.

In the multilayer holographic memory reproducing apparatus 104, when a given one of a set of a plurality of phase codes is applied on the multilayer holographic recording medium 98 through the phase spatial light modulator 108C by using the laser beam for reproduction that is similar to the reference beam used for recording, diffracted images (reproduced images) from all the recording layers can be generated simultaneously.

The diffracted image is reproduction of the object beam used for recording (although the laser beam intensity may be different) in accordance with the principle of volume hologram. Therefore, the reproduced images simultaneously generated are emitted to different directions from each other. In this embodiment, the two-dimensional photodetectors 110A to 110D and the imaging lenses 111A to 111D are provided on extensions of optical paths of object beam used for recording, respectively, and the imaging lenses 111A to 111D are arranged to form an imaging lens system together with the Fourier lens used for recording. Therefore, the spatial light modulator is presented on an imaging plane of the imaging lens system as a real image. Therefore, a plurality of reproduced images can be simultaneously detected by arranging the abovementioned two-dimensional photodetectors 110A to 110D on the abovementioned imaging plane.

INDUSTRIAL APPLICABILITY

According to the present invention, respective holographic recording layers in a multilayer holographic recording medium have different Bragg's conditions from each other and it is possible to generate diffraction beams at the same time under a common reproduction condition. As a result, recording density and a data transfer rate of the holographic recording medium can be largely improved.

The invention claimed is:

1. A multilayer holographic recording and reproducing method for holographically recording information on a multilayer holographic recording medium including a number of deposited holographic recording layers in each of which interference fringes can be formed by projecting an object beam and a reference beam that are split from a laser beam and for reproducing the recorded information by projecting a single laser beam for reproduction, the method comprising:

a process of recording the information by fixing a projection condition of the reference beam and modulating the object beam for each of the holographic recording layers so that the holographic recording layers each have a different Bragg's condition; and a process of projecting the single laser beam for reproduction having the same projection condition as that of the reference beam is projected onto the deposited holographic recording layers so as to generate a diffraction beam in an upper holographic recording layer and to make a transmitted 0-th order diffraction beam be projected onto a lower holographic layer one by one, the diffraction beams generated in the respective holographic recording layers emitted to different directions from each other at the same time by the single projected beam are detected by two-dimensional photodetectors a number of which is equal to that of the holographic recording layers, thereby simultaneously reproducing pieces of information from light-detecting signals of the two-dimensional photodetectors.

2. The multilayer holographic recording and reproducing method according to claim 1, wherein
the information is recorded by shift-multiplex recording for each of the holographic recording layers over an entire surface thereof.

3. The multilayer holographic recording and reproducing method according to claim 1, wherein
an angle of the object beam is modulated for each of the holographic recording layers during the holographic recording.

4. The multilayer holographic recording and reproducing method according to claim 3, wherein
during the reproduction of information, a beam diameter of the laser beam for reproduction is enlarged, and the laser beam for reproduction is modulated by spatial light modulation to make a part of the laser beam for reproduction incident on the holographic recording layers from a different position within the enlarged beam diameter.

5. The multilayer holographic recording and reproducing method according to claim 3, wherein
during the reproduction of information, the laser beam for reproduction is reflected by a rotating mirror and a concave mirror to be incident on the holographic recording layers.

6. The multilayer holographic recording and reproducing method according to claim 1, wherein
during the holographic recording of information, the information is recorded by modulating an intensity of the object beam in accordance with the information to be recorded and modulating the reference beam by phase spatial light modulation for each of the holographic recording layers such that the interference fringes in each of the holographic recording layers have a phase code pattern different from those in the other holographic recording layers; and
during the reproduction of information, the laser beam for reproduction is modulated by phase spatial light modulation for each of the holographic recording layers from which the information is to be reproduced, so as to have a corresponding phase code pattern, and is then projected onto the holographic recording layers.

7. A multilayer holographic recording and reproducing apparatus for recording information on a multilayer holographic recording medium including a number of deposited holographic recording layers in each of which interference fringes can be formed by projecting an object beam and a reference beam from a laser beam source and for reproducing the recorded information by projecting a single laser beam for reproduction, the apparatus comprising:

an object optical system and a reference optical system for directing the object beam and the reference beam to the multilayer holographic recording medium, respectively;

a reproducing laser optical system for projecting the single laser beam for reproduction onto the deposited holographic recording layers; and two-dimensional photodetectors for reproducing pieces of information from diffraction beams generated in the respective holographic recording layers by the single laser beam for reproduction, a number of the two-dimensional photodetectors being equal to that of the diffraction beams, wherein the reference optical system is configured to fix a projection condition of the reference beam, the object optical system includes an object beam modulator for modulating the object beam for each of the holographic recording layers to record information on each of the holographic recording layers with a different Bragg's condition, the reproducing laser optical system is configured to make the single laser beam for reproduction be projected onto the deposited holographic recording layers with the same projection condition as that of the reference beam so as to generate a diffraction beam in an upper holographic recording layer and to make a transmitted 0-th order diffraction beam be projected onto a lower holographic layer one by one and to generate the diffraction beams in the respective holographic recording layers emitted to different directions from each other at the same time, and the two-dimensional photodetectors are configured to simultaneously detect diffraction beams generated in the respective holographic recording layers by the single projected beam.

8. The multilayer holographic recording and reproducing apparatus according to claim 7, wherein
the object optical system and the reference optical system are configured to record the information by shift-multiplex recording for each of the holographic recording layers over an entire surface thereof.

9. The multilayer holographic recording and reproducing apparatus according to claim 7, wherein
the object beam modulator is an angle modulator for modulating an angle of the object beam for each of the holographic recording layers during the holographic recording.

10. The multilayer holographic recording and reproducing apparatus according to claim 9, comprising: a beam expander for enlarging a beam diameter of the laser beam for reproduction during the reproduction of information; and a spatial light modulator for modulating the laser beam for reproduction having the enlarged beam diameter by spatial light modulation to make a part of the laser beam for reproduction incident on the holographic recording layers from a different position within the enlarged beam diameter.

11. The multilayer holographic recording and reproducing apparatus according to claim 9, comprising an angle modulator for a laser beam for reproduction that reflects the laser beam for reproduction by a rotating mirror and a concave mirror to make the laser beam for reproduction incident on the holographic recording layers during the reproduction of information.

12. The multilayer holographic recording and reproducing apparatus according to claim 7, wherein
the object optical system includes an amplitude spatial light modulator for modulating an intensity of the object beam in accordance with the information to be recorded during the holographic recording of information, and the reference optical system includes a phase spatial light modulator for modulating the reference beam for each of the holographic recording layers by phase spatial light modulation to make interference fringes in the respective holographic recording layers have a different phase code pattern from each other, and
the reproducing laser optical system includes a phase spatial light modulator for a laser beam for reproduction that modulates the laser beam for reproduction by phase spatial light modulation for each of the holographic recording layers from which the information is to be reproduced during the reproduction of information such that the laser beam for reproduction has a corresponding phase code pattern.

13. The multilayer holographic recording and reproducing apparatus according to claim 7, wherein
wherein at least one of the object optical system has an angle modulator for modulating an angle of the reference beam for each of the holographic recording layers during the holographic recording, and the reference optical system has an angle modulator for modulating an angle of the object beam for each of the holographic recording layers during the holographic recording.

* * * * *